US012589560B2

(12) United States Patent
Lanfant et al.

(10) Patent No.: US 12,589,560 B2
(45) Date of Patent: Mar. 31, 2026

(54) METHOD FOR MANUFACTURING A GRID MADE OF A COMPOSITE MATERIAL

(71) Applicant: SAFRAN, Paris (FR)

(72) Inventors: Nicolas Pierre Lanfant, Moissy-Cramayel (FR); Maximilien Eddie Farrands, Moissy-Cramayel (FR); Pierre Francois Robin Geraud-Grosheny, Moissy-Cramayel (FR)

(73) Assignee: SAFRAN, Paris (FR)

( * ) Notice: Subject to any disclaimer, the term of this patent is extended or adjusted under 35 U.S.C. 154(b) by 216 days.

(21) Appl. No.: 17/757,547

(22) PCT Filed: Dec. 17, 2020

(86) PCT No.: PCT/FR2020/052501
§ 371 (c)(1),
(2) Date: Jun. 16, 2022

(87) PCT Pub. No.: WO2021/123639
PCT Pub. Date: Jun. 24, 2021

(65) Prior Publication Data
US 2023/0027311 A1 Jan. 26, 2023

(30) Foreign Application Priority Data
Dec. 19, 2019 (FR) ...................................... 1915028

(51) Int. Cl.
*B29C 70/42* (2006.01)
*B29C 45/14* (2006.01)
(Continued)

(52) U.S. Cl.
CPC ........ *B29C 70/42* (2013.01); *B29C 45/14467* (2013.01); *B29C 70/14* (2013.01);
(Continued)

(58) Field of Classification Search
CPC ......... B29C 70/42; B29C 70/22; B29C 70/06; B29C 70/34; B29C 70/16;
(Continued)

(56) References Cited

U.S. PATENT DOCUMENTS 4,173,307 A 11/1979 Ittner
4,596,621 A * 6/1986 Nawaz .................... F02K 1/605
244/110 B
(Continued)

FOREIGN PATENT DOCUMENTS

EP 0219889 A2 4/1987
JP 07-016935 A 1/1995
(Continued)

OTHER PUBLICATIONS

International Search Report and Written Opinion received for PCT Patent Application No. PCT/FR2020/052501, mailed on Apr. 13, 2021, 18 pages (8 pages of English Translation and 10 pages of Original Document).

*Primary Examiner* — Alison L Hindenlang
*Assistant Examiner* — Debjani Roy
(74) *Attorney, Agent, or Firm* — WOMBLE BOND DICKINSON (US) LLP

(57) ABSTRACT

The invention relates to a method for producing a grid made of composite material for straightening an air flow for an aircraft turbine engine. The described method is based on the use of longitudinal members (301) which have recesses (303) to allow the penetration of connecting elements (304) into said recesses during the manufacture of the grid.

10 Claims, 6 Drawing Sheets

(51) Int. Cl.

| | | |
|---|---|---|
| *B29C 70/14* | (2006.01) | |
| *B29C 70/22* | (2006.01) | |
| *F02K 1/54* | (2006.01) | |
| *B29L 31/00* | (2006.01) | |
| *B29L 31/08* | (2006.01) | |

(52) U.S. Cl.

CPC ................ *B29C 70/22* (2013.01); *F02K 1/54* (2013.01); *B29L 2031/08* (2013.01); *B29L 2031/737* (2013.01); *F05D 2220/323* (2013.01); *F05D 2300/6034* (2013.01)

(58) Field of Classification Search

CPC ......... B29L 2031/737; F05D 2300/603; F05D 2300/6034; F01D 5/282

See application file for complete search history.

(56)             References Cited

U.S. PATENT DOCUMENTS

| | | | |
|---|---|---|---|
| 9,587,582 B1 | 3/2017 | Schaefer et al. | |
| 2018/0045207 A1* | 2/2018 | Paquin .................. | B32B 27/281 |
| 2020/0114590 A1* | 4/2020 | Ikeda .................... | B29C 66/223 |
| 2020/0231767 A1* | 7/2020 | Deitmerg ................ | B29C 70/42 |

FOREIGN PATENT DOCUMENTS

| | | | | |
|---|---|---|---|---|
| JP | 07016935 | * | 1/1995 | ............. B29C 70/06 |
| WO | 2018/169453 A2 | | 9/2018 | |

* cited by examiner

METHOD FOR MANUFACTURING A GRID MADE OF A COMPOSITE MATERIAL

TECHNICAL FIELD OF THE INVENTION

The invention relates to the field of manufacturing mechanical parts for aircraft turbojet engine nacelles. It relates, in particular, to a method for manufacturing a grid made of composite material such as a thrust reverser grid for such a nacelle.

TECHNICAL BACKGROUND

The prior art comprises in particular the documents EP-A2-0 219 889, JP-A-H07 16935, WO-A2-2018/169453, U.S. Pat. Nos. 4,173,307, and 9,587,582.

The thrust reversal systems or reversers are now widely used in the aircrafts. Their role is to exploit a portion of the air flow ejected at the rear of the turbojet engine nacelles to contribute to the braking of the aircraft if necessary. In particular, when landing an aircraft, the braking capability of said aircraft can be substantially improved by redirecting forward at least one portion of the air ejected by the turbojet engine.

More precisely, the reverser allows to redirect a portion of the air flow towards the front of the nacelle which generates a counter-thrust which comes in addition to the braking of the wheels and of the airbrakes.

In the case of a reverser referred to as deflection grids, also referred to as thrust reverser grids, the redirection of the air flow is performed by grids, associated with reverser flaps, which at least partially block an air flow duct. A sliding cover also allows these thrust reverser grids to be exposed or covered.

FIGS. 1a and 1b show an example of an embodiment of a thrust reversal grid 101. In a known way, such a grid is constituted, on the one hand, of spars 102 which fulfil the function of support and, on the other hand, of vanes 103 which contribute effectively to direct the air flow. The spars and the vanes extend longitudinally, respectively, in two substantially perpendicular directions and form the outlines of hollow cells 104 also referred to as alveoli. In addition, the spars and the vanes are joined at the level of braces 105, the strength of which largely determines the strength of the grid as a whole.

These grids are made of composite materials. Classically, the spars are made of a material referred to as with continuous (or long) fibres. Specifically, the spars are formed from overlapping folds of a material while the vanes are formed from a fold suitably positioned to form the alveoli of the grid. The material or the materials used have specific mechanical properties, adapted to their function and the whole is linked by a matrix, typically a thermosetting or thermoplastic resin, which unites the different elements, defines the overall shape of the grid and ensures the transmission of the mechanical forces.

The applicant has so far followed a manufacturing approach aiming to simply and economically produce such a grid. FIG. 2 illustrates this approach in which a continuous fibre spar 201 is positioned, parallel to other spars not shown, along a first direction. Connecting elements 202, made of discontinuous fibre composite material, are positioned on either side of the spar 201, along the lateral faces 204a and 204b of said spar 201.

The whole is placed in a thermocompression device (not shown), such as an autoclave or a press tooling, in which the whole is heated to a temperature and a pressure that renders the materials flowable and the connecting elements are compressed by suitable compression means 203 adapted to form the future vanes of the grid and thus delimit the cells of the manufactured grid. By flowable we mean the state of a material that is adapted to flow. During this operation, a portion of the material that makes up the connecting elements migrates towards the spars and connects, by chemical connection and/or mechanical connection, with the material that makes up these spars.

However, this connection remains relatively superficial. This is because the way in which the discontinuous fibre composite material migrates, and in particular the fibres themselves, is random. The overlap surface areas (between the material of the connecting elements and the lateral faces of the spars) can be quite small, which then leads to low mechanical strength performance of the whole.

It is precisely expected that a thrust reverser grid, on the one hand, has a certain stiffness in the direction of its length and, on the other hand, that it offers a good mechanical strength of the vane-spar interfaces (i.e. of the braces). Indeed, the good mechanical strength of these interfaces conditions, on the one hand, the strength of the vane to the pressure of the air flow (in particular during the phases of thrust reversal generation) and, on the other hand, the strength of the grid to the possible impacts of foreign bodies.

SUMMARY OF THE INVENTION

The present invention proposes a solution allowing both to obtain a grid that benefits from the stiffness and strength properties of unidirectional fibres used for the realization of spars and to obtain, during the manufacturing, a mechanical anchoring of the vanes on the spars and thus a reinforcement of the vane-spar interfaces.

To this end, according to a first aspect, the invention relates to a method for manufacturing a grid made of composite material for straightening an air flow for an aircraft turbomachine, this method comprising the following steps:

a) positioning, in a thermocompression device, spars extending longitudinally in a first direction, said spars being made of a first material comprising fibres extending parallel to the first direction, these spars comprising lateral faces comprising recesses;

b) positioning, in the thermocompression device, between the lateral faces of the spars, connecting elements, made of a second thermo-compressible material; and, c) subjecting, by the thermocompression device, the spars and the connecting elements to a determined temperature and a determined pressure, adapted to cause a portion of the connecting elements to penetrate said recesses so as to ensure a mechanical anchoring of the connecting elements in said recesses of the spars.

The method according to the invention may comprise one or more of the following characteristics, taken alone or in combination with each other:

during the step b), the connecting elements are positioned in a direction substantially perpendicular to the first direction, preferably between tooling cores.

the spars are made from continuous fibres, for example carbon fibres, arranged in draped unidirectional folds, in a two-dimensional weaving, in a three-dimensional weaving, or in a combination of these arrangements.

the spars are made from long discontinuous fibres.

the recesses are obtained by means of manual or automatic cutting means, such as a machining machine, an oscillating blade, ultrasound waves, scissors, a scalpel or a punch.

the recesses are blind holes, slots or through holes.

the second thermo-compressible material is made from the cutting of continuous fibre folds pre-impregnated with a resin into chips.

the second thermo-compressible material comprises fibres and a thermosetting resin belonging to the family of epoxides, benzoxasins, polyesters or bismaleimides.

the second thermo-compressible material comprises fibres and a thermoplastic resin belonging to the family of polyamides, polypropylenes, PEEK, PEKK, PPS, PSA or PA.

the thermocompression device comprises compression means and/or moulding means and/or injection means adapted to form hollow cells, delimited by the spars and the connecting elements, at the end of the step c).

the formation of hollow cells is made by thermoplastic injection of short fibres between tooling cores.

during the steps b) and c), the second thermo-compressible material of the connecting elements, made of discontinuous fibres, is contained in a tooling cavity and pushed out of the cavity by a piston, so as to cause a portion of the connecting elements to penetrate into the recesses and to ensure a mechanical anchoring of the connecting elements to the spars.

The invention also relates, according to a second aspect, to a grid made of composite material for straightening an air flow for an aircraft turbomachine, this grid being made by a method according to the first aspect and comprising parallel spars formed from a first material comprising fibers extending parallel to the direction of the longitudinal extent of said spars and connected together by connecting elements formed from a second material and mechanically anchored in recesses of said spars.

Finally, according to a third aspect, the invention relates to a turbomachine, in particular for an aircraft, comprising a grid according to the second aspect, this grid being for example part of a thrust reverser.

BRIEF DESCRIPTION OF THE FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DETAILED DESCRIPTION OF THE INVENTION

Figure 1A:
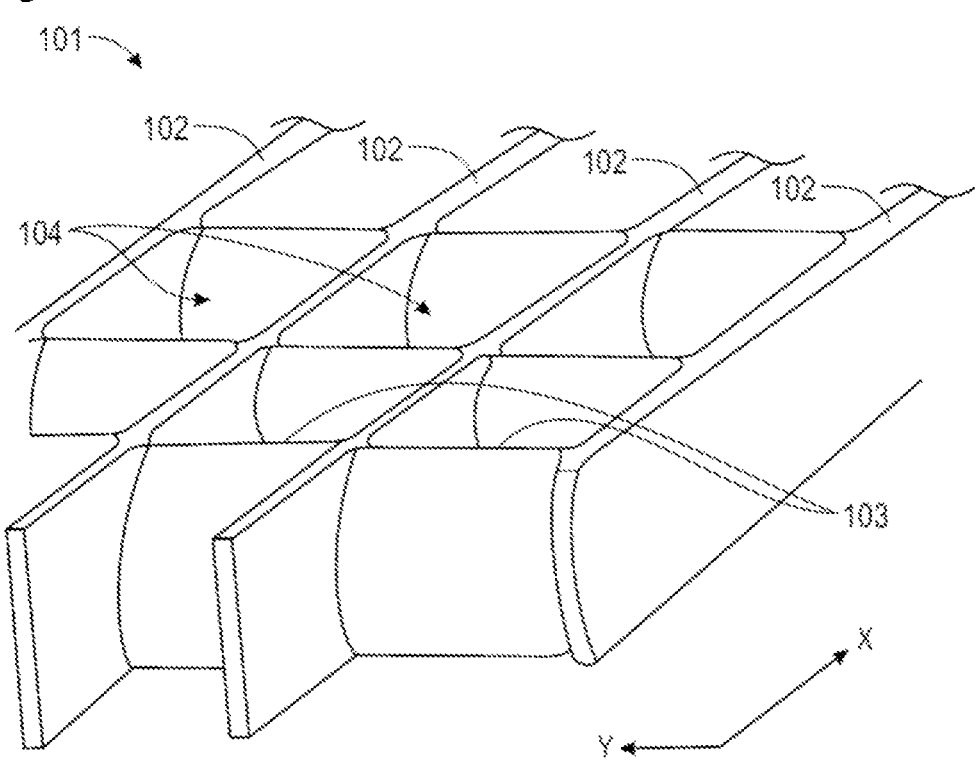
FIG. 1a is a schematic representation of an embodiment of a grid made of composite material according to the prior art.
Figure 1B:
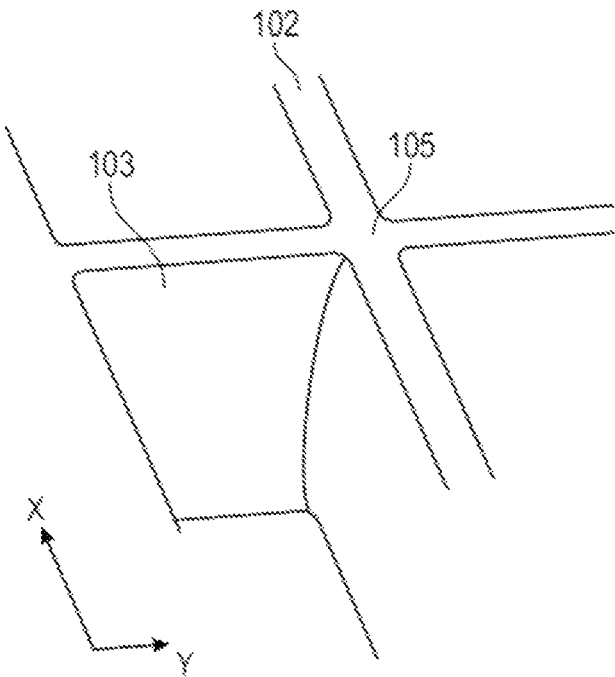
FIG. 1b is a zoom on the intersection area of the spars and the vanes of a grid made of composite material according to the prior art.
Figure 2:
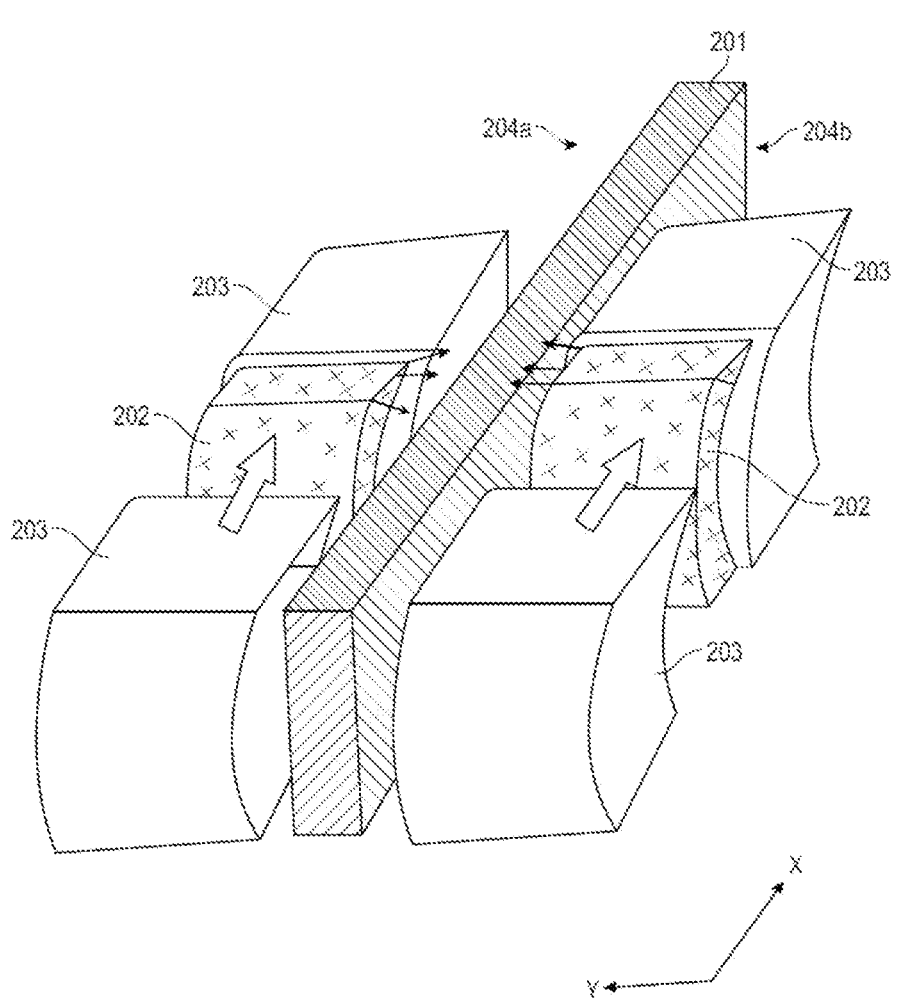
FIG. 2 is a schematic representation of an embodiment of a method for manufacturing a grid made of composite material according to the prior art.
Figure 3:
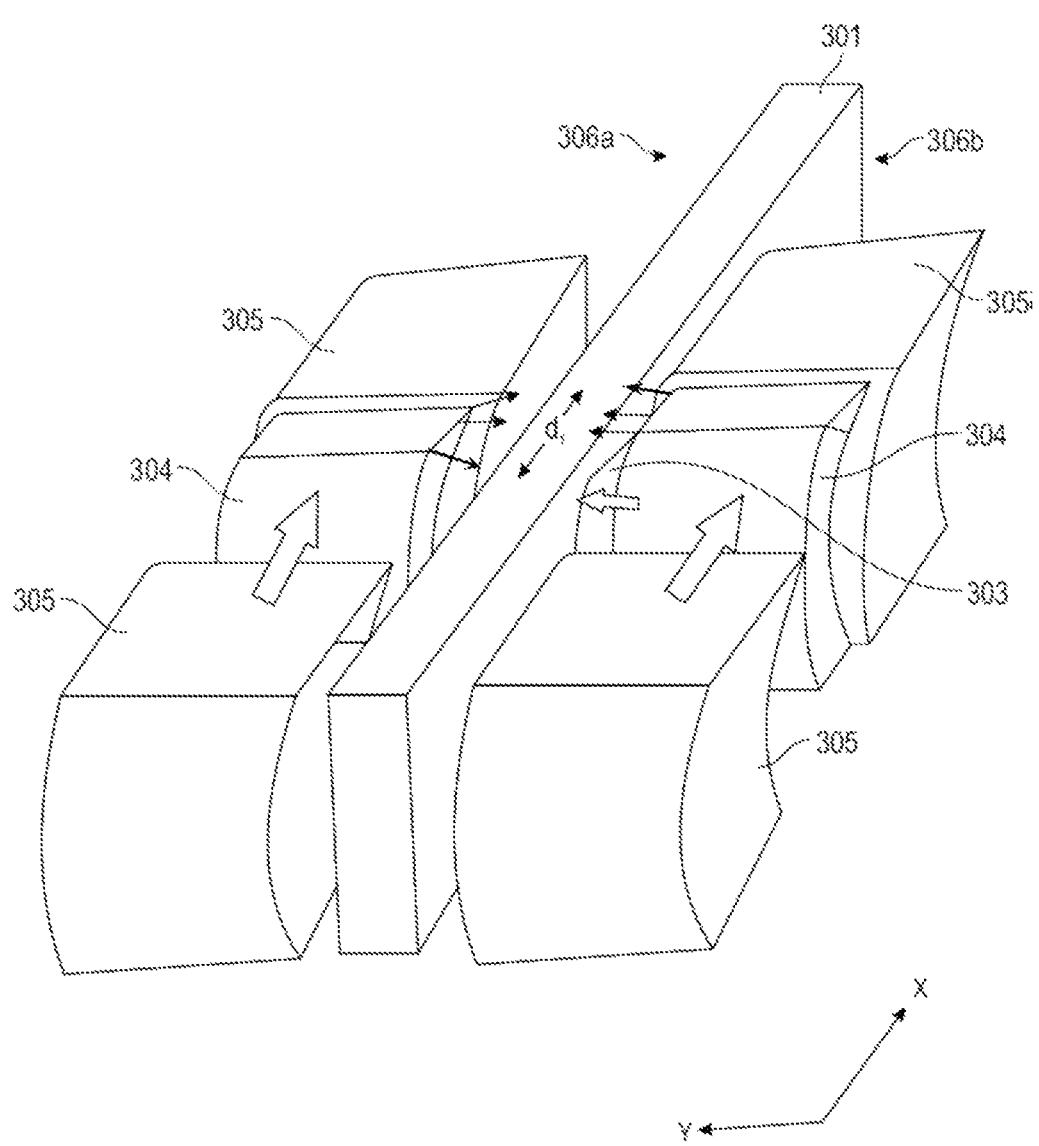
FIG. 3 is a schematic representation of an embodiment of a method for manufacturing a grid made of composite material according to the invention.
Figure 4:
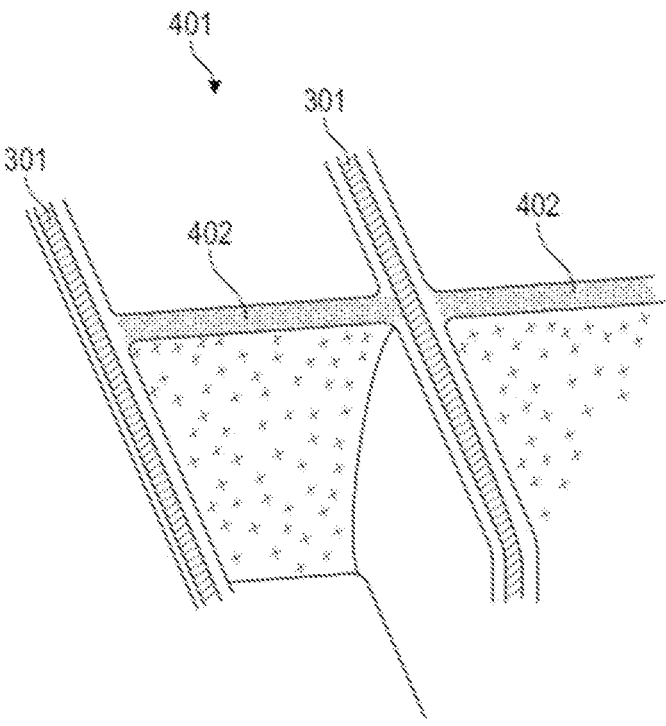
FIG. 4 is a schematic representation of an embodiment of a grid made of composite material according to the invention.
Figure 8:
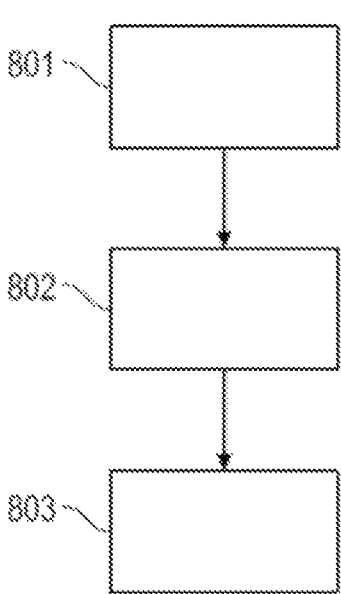

With reference to FIG. 3, FIG. 4 and FIG. 8, we will now describe an embodiment of the manufacturing method a grid made of composite material according to the invention. The invention relates in particular to the manufacture of straightening grids for an air flow for an aircraft turbomachine. However, it will be appreciated by the person skilled in the art that the method is generally applicable to the manufacture of any grid made of composite material that comprises elements aligned in a first direction and elements aligned in a second direction that together form hollow cells.

The first step 801 consists of positioning, in a thermocompression device, spars 301 that extend longitudinally along a first direction dl. In the example shown, a single spar 301 is shown, aligned along the direction dl, parallel to the axis X. The thermocompression device may be, for example, an autoclave in which the spars are placed.

The spars are made of a first material that comprises fibres that extent parallel to the first direction. In a non-limiting example, the spars are made from continuous fibres, such as carbon fibres, which are arranged in draped unidirectional folds, in a two-dimensional weaving, in a three-dimensional weaving, or in a combination of these arrangements. Advantageously, these arrangements allow to obtain a determined mechanical strength in one or more desired directions. In addition, for spars made of fibres arranged in draped unidirectional folds, a compacting and/or a pre-curing of the spar may have been made prior to the manufacture of the grid in order to improve the shape retention of the spar. Thus, in the different variants of the method, the spars used can be referred to as raw or partially pre-cured or fully pre-cured. The optimal configurations are raw and partially pre-cured, such as 50 to 60% progress of the polymerization of the resin.

In one variant, the spars can be made of fibres referred to as long discontinuous, i.e. spars made from folds cut to a length greater than that of fibres referred to as short but nevertheless cut and therefore referred to as discontinuous.

Finally, the spars comprise lateral faces 306a and 306b which themselves comprise recesses 303. As will become clearer in what follows, the presence of these recesses allows to a second material used for the manufacture of the grid to diffuse through the spars during the manufacture. In particular, since, without the presence of these recesses, the use of continuous fibres for the spars would provide a barrier avoiding the diffusion of another material into them.

The recesses can be obtained by means of manual or automatic cutting means, such as a machining machine, an oscillating blade, ultrasonic waves, scissors, a scalpel or a punch. In addition, depending on the different embodiments of the manufacturing method, the recesses can be blind holes, slots or through holes.

Figure 5:
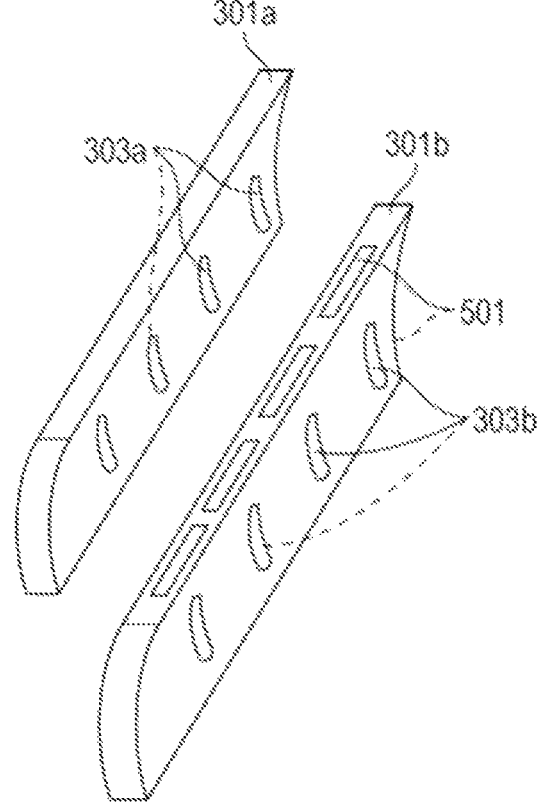
FIG. 5 is a perspective view of embodiments of spars of a grid made of composite material according to the invention.
Figure 6:
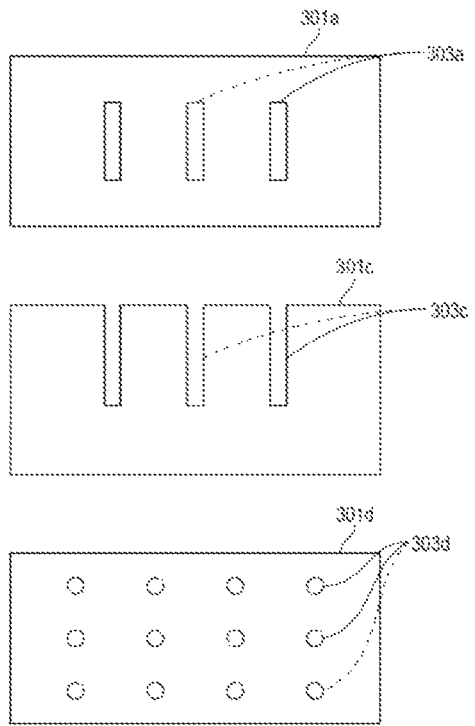
FIG. 6 is a front view of embodiments of spars of a grid made of composite material according to the invention.

FIGS. 5 and 6 illustrate, respectively, in perspective view and in front view, embodiments of spars according to the invention. Thus, in the examples shown, the recesses 303a are in the form of rectangular holes, the recesses 303d are in the form of circular holes, the recesses 303c open onto another face of the spars (which is not a lateral face), and the recesses 303b open onto cavities 501 which themselves open onto another face of the spars.

Advantageously, the shape and the distribution of the recesses can be adapted to optimize the mechanical strength obtained, at the end of the manufacturing method, at the level of the braces of the grid.

The step 802 consists of positioning, in the thermocompression device, between the lateral faces of the spars, connecting elements 304, made of a second thermo-compressible material. In a particular embodiment, the connecting elements are positioned, between tooling cores, in a direction substantially perpendicular to the direction dl of the spars. The second thermo-compressible material can be a discontinuous fibre material, such as a material made from the cutting of continuous fibre folds pre-impregnated with a resin into chips, such as for example the material HexMC, from the manufacturer Hexcel. The interest of this material is in particular its capacity to flow, i.e. to flow when subjected to suitable temperature and pressure conditions.

In a particular embodiment of the method, the second thermo-compressible material comprises fibres and a thermosetting resin belonging to the family of epoxies, benzoxasins, polyesters or bismaleimides. In another particular embodiment of the method, the second thermo-compressible material comprises fibres and a thermoplastic resin belonging to the family of polyamides, polypropylenes, PEEK, PEKK, PPS, PSA or PA. Advantageously, the thermocompressible material used can be chosen according to its ability to flow, its mechanical strength once cured or any other property adapted to optimize the properties of the grid as a whole.

The final step 803 of the manufacturing method consists of subjecting, by the thermocompression device, the spars and the connecting elements to a determined temperature and a determined pressure, which are adapted to cause a portion of the connecting elements to penetrate into said recesses so as to ensure a mechanical anchoring of the connecting elements to the spars. In other words, by heating and compressing the connecting elements 304, the material of which they are composed migrates both onto the lateral faces 306a and 306b of the spars but also into the recesses 303 of these lateral faces. Advantageously, the braces thus formed offer a high mechanical strength. In particular, thanks to the fact that the manufacturing method allows, on the one hand, to obtain a continuity of the fibres between the spars and the connecting elements and, on the other hand, to obtain a continuity of the fibres between the connecting elements on both sides of the spars.

Finally, as illustrated in FIG. 4, the grid 401 made of composite material thus manufactured comprises parallel spars 301 formed from the first material and connected together by connecting elements 402 (vanes in the case of a thrust reversal grid) formed from the second material and mechanically anchored in recesses in the spars.

Furthermore, in different embodiments of the manufacturing method, the thermocompression device may comprise compression means and/or moulding means and/or injection means adapted to form the hollow cells of the grid which are delimited by the spars and the connecting elements at the end of the manufacturing method.

For example, in a first embodiment with reference to FIG. 3, tooling cores 305 are positioned on either side of the connecting elements and the connecting elements are compressed under the action of a jack pushing some of these cores in the direction of the spars.

In another embodiment, the tooling cores may have an ability to expand under the influence of temperature (i.e., to expand) or the insertion of another tool therein so as to compress the connecting elements together.

Figure 7:
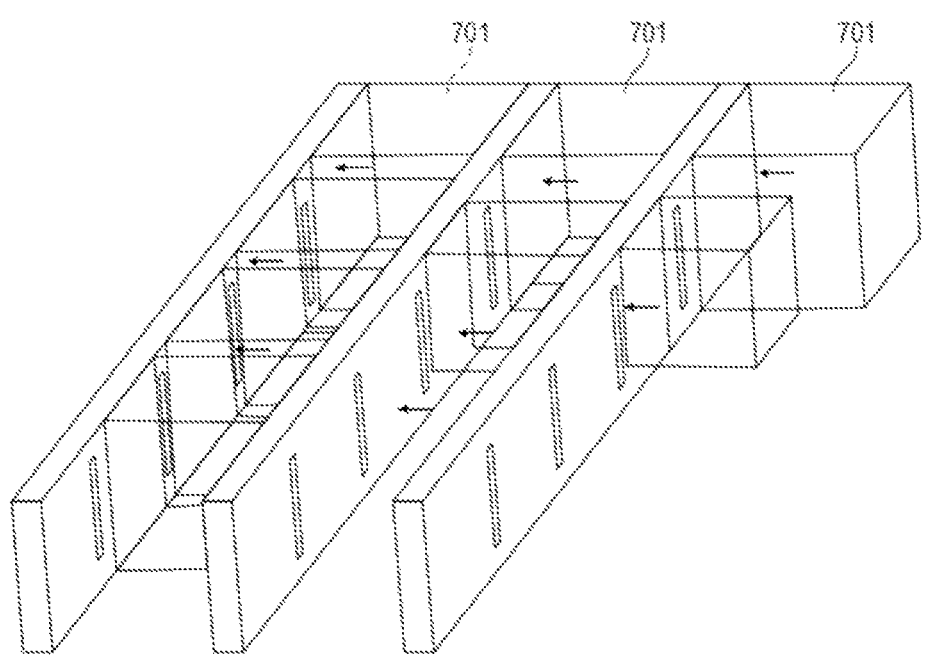
FIG. 7 is a schematic representation of another embodiment of a method for manufacturing a grid made of composite material according to the invention; and, FIG. 8 is a step diagram of an embodiment of a method for manufacturing a grid made of composite material according to the invention.

In yet another embodiment, illustrated by FIG. 7, the spars are arranged between the cores 701 of a tooling and the second material of the connecting elements, is directly injected, in a state allowing it to flow, between these cores, along a direction transverse to that of the spars. In addition, the injection step can be a thermoplastic injection of short fibres between tooling cores arranged to allow the formation of the cells. Advantageously, the fibres contained in the second material are thus aligned at the time of manufacture. Finally, in a complementary manner, the second material, made of discontinuous fibres, can be contained in cavities of a tooling and pushed out of said cavities under the effect of a piston so as to circulate between the cores of the tooling.

The invention claimed is:

1. A method for manufacturing a grid made of composite material for straightening an air flow for an aircraft turbomachine, this method comprising the following steps:
   a) positioning, in a thermocompression device, spars extending longitudinally in a first direction, said spars being made of a first material comprising fibres extending parallel to the first direction, these spars comprising lateral faces comprising recesses;
   b) positioning, in the thermocompression device, between the lateral faces of the spars and outside the recesses, connecting elements, made of a second thermo-compressible material; and,
   c) subjecting, by the thermocompression device, the spars and the connecting elements to a determined temperature and a determined pressure, adapted to cause a portion of the connecting elements to penetrate said recesses so as to ensure a mechanical anchoring of the connecting elements in said recesses of the spars,
   the thermocompression device comprising at least one of a compression means, a moulding means and an injection means adapted to form hollow cells, delimited by the spars and the connecting elements, at the end of the step c), and
   during the steps b) and c) the second thermo-compressible material of the connecting elements, made of discontinuous fibres, is contained in a tooling cavity and pushed out of the cavity by a piston, so as to cause a portion of the connecting elements to penetrate into the recesses and create a mechanical anchoring of the connecting elements to the spars.

2. The manufacturing method of claim 1, wherein during the step b), the connecting elements are positioned in a direction substantially perpendicular to the first direction, preferably between tooling cores.

3. The manufacturing method according to claim 1, wherein the spars are made from continuous fibres, for example, carbon fibres, arranged in draped unidirectional folds, in a two-dimensional weaving, in a three-dimensional weaving, or in a combination of these arrangements.

4. The manufacturing method according to claim 1, wherein the spars are made from long discontinuous fibres.

5. The manufacturing method according to claim 1, wherein the recesses are obtained by means of manual or automatic cutting means, such as a machining machine, an oscillating blade, ultrasonic waves, scissors, a scalpel or a punch.

6. The manufacturing method according to claim 1, wherein the recesses are blind holes, slots or through holes.

7. The manufacturing method according to claim 1, wherein the second thermo-compressible material is made from the cutting of continuous fibre folds pre- impregnated with a resin into chips.

8. The manufacturing method according to claim 1, wherein the second thermo-compressible material comprises fibres and a thermosetting resin belonging to the family of epoxides, benzoxasins, polyesters or bismaleimides.

9. The manufacturing method according to claim 1, wherein the second thermo-compressible material comprises fibres and a thermoplastic resin belonging to the family of polyamides, polypropylenes, PEEK, PEKK, PPS, PSA or PA.

10. The manufacturing method of claim 1, wherein, the formation of hollow cells is made by thermoplastic injection of short fibres between tooling cores.

\*  \*  \*  \*  \*